United States Patent [19]

Behringer

[11] 4,279,217

[45] Jul. 21, 1981

[54] LINER FOR A LITTER BOX

[76] Inventor: Rebecca K. Behringer, 8524 Etta Dr., Springfield, Va. 22152

[21] Appl. No.: 41,101

[22] Filed: May 21, 1979

[51] Int. Cl.³ .............................................. A01K 1/00
[52] U.S. Cl. ......................................... 119/1; 4/484
[58] Field of Search .............. 119/1; 4/142, 112, 116; 229/63, 53; 150/3, 1

[56] References Cited

U.S. PATENT DOCUMENTS

| 2,315,390 | 3/1943 | Billeb | 4/142 |
| 3,061,840 | 11/1962 | Presseisen | 4/142 |
| 3,346,883 | 10/1967 | Ersek | 4/142 |
| 3,831,557 | 8/1974 | Elesh | 119/1 |
| 4,011,606 | 3/1977 | Scrafield | 4/142 |

*Primary Examiner*—Jay N. Eskovitz

[57] ABSTRACT

A disposable plastic film liner for an animal litter box is improved by having an opening in the liner, at about the center thereof, which communicates with a collapsible pocket adapted to lie flat beneath the liner when in use lining the inside of the litter box. As the liner is lifted out of the box by gripping and raising opposite ends of the plastic, the soiled adsorbent runs into the pocket and can then be easily disposed of.

12 Claims, 6 Drawing Figures

LINER FOR A LITTER BOX

This invention relates to disposable plastic film liners for animal litter boxes. More particularly, it relates to an improvement in such liners whereby they are less apt to contribute to spilling of the soiled adsorbent when liner and adsorbent are removed from the box.

Animal litter boxes are frequently lined with a disposable plastic film liner before placing a layer of particulate, sanitary adsorbent in them. The purpose of the liner is to keep the inner surface of the box clean and to facilitate removal of the adsorbent, after it has become soiled, from the box to a waste receptacle. Heretofore these liners have either been bags or flat rectangles of plastic film, and they have had definite drawbacks.

Bag type liners are disclosed, for example, in U.S. Pat. Nos. 3,227,137; 3,684,155; 3,771,493; and 3,831,557. Unless the configuration of such a liner fits precisely the contour of the interior of the litter box, it tends to bunch up, or gather in loose folds, under the adsorbent, and be caught and torn by the claws of the animal using the box. A cat, for example, will frequently tear a bag liner when it digs a depression in the adsorbent layer, preparatory to using the commode, as well as when it thrusts its hind legs in order to cover its waste. Spillage of soiled adsorbent through the tear holes results when the liner is later lifted out of the box.

Flat, rectangular liners tend to hug the bottom of the box, and thus suffer fewer claw tears. However, flat liners are practically impossible to lift out of the box at changing time without some of the soiled adsorbent spilling over the liner's edge, unless two people do it or the liners are ridiculously oversized for the box, in which case they waste a good deal of material and present an unaesthetic overhang around all four sides of the box. Contoured, or fitted, liners suffer the same drawback. In addition, they only avoid bunching up, and resultant tear holes, when they are used with the proper size box—not too large and not too small.

It is generally recognized by pet owners, especially the owners of cats, that the task of removing soiled litter box adsorbent is unpleasant enough, without having to cope with spillages in the bargain. The present invention provides a solution to the problem: a disposable liner which resists tearing by the pet's claws, yet can be easily and quickly removed from the litter box along with the soiled adsorbent. What is more, one size of the liner of the present invention can easily fit a wide range of litter box sizes.

The present invention improves a flat, disposable, plastic film liner for an animal litter box by providing an opening in the liner, at about its center, which communicates with a collapsible pocket adapted to lie flat beneath the liner when it is inside the litter box. When in position in the box, beneath a layer of adsorbent, the liner lies flat against the bottom of the box, and thus is not as susceptible to claw tears as are the bag type liners. But when the liner is grasped by its opposite edges and lifted out of the box, the pocket falls down, opens, and receives the soiled adsorbent, which runs into it by force of gravity. Securely caught in the pocket, the adsorbent can then be carried to a waste receptacle without spillage.

Even if the liner of the present invention is used in a litter box for an animal which has an especial propensity for clawing holes in liners, it is still likely that only the top layer of film will be torn. The walls of the pocket, which lie beneath the top layer of plastic, will in all likelihood remain unbroken. What spillage does occur upon removal of a liner torn in that manner is a very small amount, because it occurs only for the brief instant that the adsorbent is running down the inclined top layer of film into the pocket. Also, the spilled adsorbent falls inside the litter box, where it can be cleaned up more easily than if spilled on the floor enroute to a trash receptacle.

The type and thickness of the plastic film used to make the liner of the present invention is not critical. Low density polyethylene film, like that commonly used for household trash bags, is quite suitable. The film should be thick enough, of course, to support the adsorbent, and preferably thick enough to give some resistance to claw tears. A thickness in the range of about 0.8 to 2.0 mil, e.g., about 1.0 to 1.5 mil, will suffice.

Cat litter boxes which are on the market today generally have a rectangular configuration (top view), and are essentially composed of a bottom and four sides. Accordingly, it is preferred that the liner of the present invention, when flattened out, also be shaped like a rectangle.

The opening in the liner is advantageously a transverse slit which extends all or part of the way across the liner. The pocket is preferably shaped so as to be collapsible into a flat rectangle which can lay to one side of the opening, beneath the liner, when the liner is laying in the litter box.

As mentioned above, an advantageous feature of the liner of the present invention is that it does not have to be specially sized for the box with which it is used, as, for example, square bottom bag liners must be. All that is required is that the pocket be large enough to hold all of the adsorbent, and that the liner be long enough and wide enough to cover the entire interior of the box.

Preferably the litter box with which the liner of the present invention is used will have means for releasably holding the liner to the top of the sides of the box. A rim, or partial cover, which fits tightly around the top of the sides of the box, clamping the peripheral margin of the liner between the top of the sides of the box and the rim, is an example of such holding means.

The present invention will perhaps be better understood by reference to the drawings accompanying this specification, a discussion of which now follows.

Figure 1:
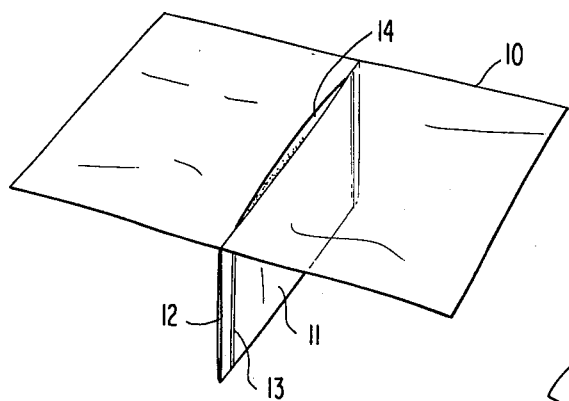
FIG. 1 is an elevated view of a disposable plastic litter box liner of the present invention.
Figure 2:
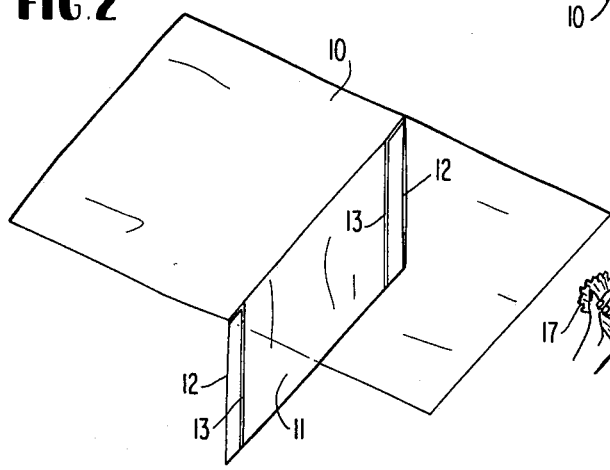
FIG. 2 is a view from below of the liner shown in FIG. 1.

Looking at FIGS. 1 and 2, it is seen that the liner 10 is made of a single piece of transparent, thermoplastic film, originally in the shape of an elongated rectangle. A transverse fold 11 is taken in the center of the plastic film, and the edges 12 of the fold are shut by L-shaped seams 13, which are heat pressed into the plastic. As a result, fold 11 has the configuration and function of a pocket, which is in communication with transverse slit 14, which extends substantially all the way across the liner.

Figure 3:
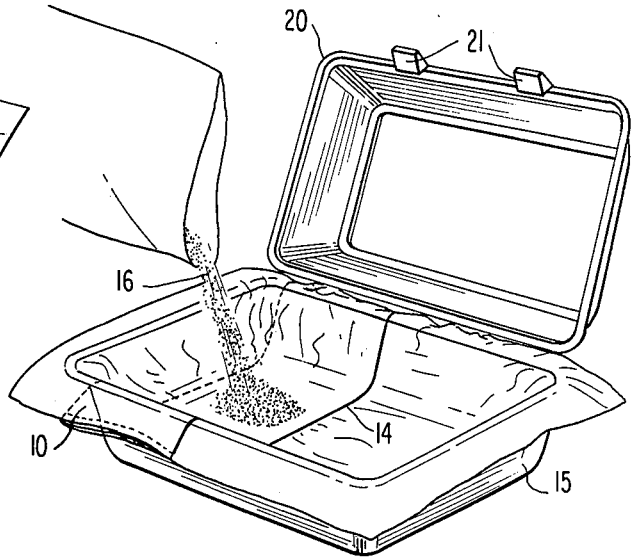
FIG. 3 shows a cat commode comprising the combination of a litter box, the liner shown in FIGS. 1 and 2, and a layer of particulate, sanitary adsorbent.

Looking now at FIG. 3 of the drawings, it is seen that liner 10 is placed in a standard, molded plastic, cat litter box 15 (shown in greater detail in U.S. Pat. No. 3,831,557), so that pocket 11 (shown by broken lines) of liner 10 lies flat beneath the liner and to the left side of transverse slit 14.

Sanitary adsorbent 16 is poured into box 15, on top of liner 10. Before putting the commode to use, rim 20, which is hinged to the top of one of the side walls of box 15, is lowered into place (not shown in the drawings) so that it fits tightly around the top of the sides of box 15. Flexible locking tabs 21 releasably hold lid 20 in the lowered position, thus clamping the peripheral margin of liner 10 between rim 20 and the top of the sides of box 15.

Figure 4:
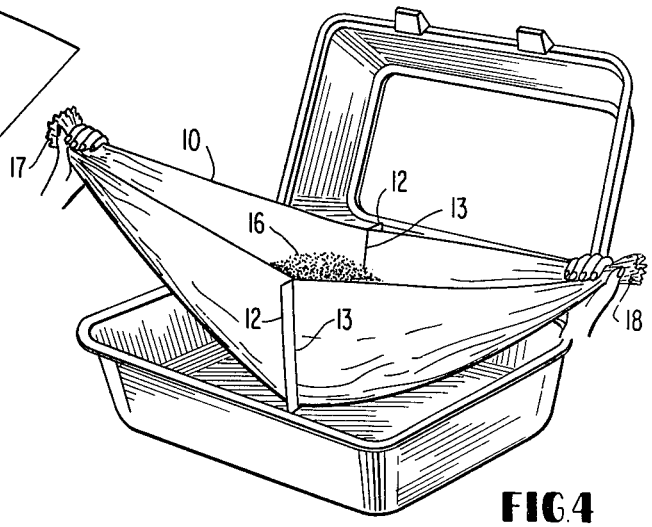
FIG. 4 shows the disposable liner, together with soiled adsorbent, being removed from the litter box.

When adsorbent 16 becomes soiled and it is desired to replace it, FIG. 4 shows how the opposite ends 17 and 18 of liner 10 are separately gathered together in one's hands and then lifted up so as to suspend the liner like a hammock. The weight of the soiled adsorbent 16 forces open slit 14 and the adsorbent slides into pocket 11 without spilling over the sides of the liner. Because liner 10 has lain substantially flat in box 15, with pocket 11 protected beneath a top layer of film, no claw holes appear in the liner for escape of the adsorbent.

Figure 5:
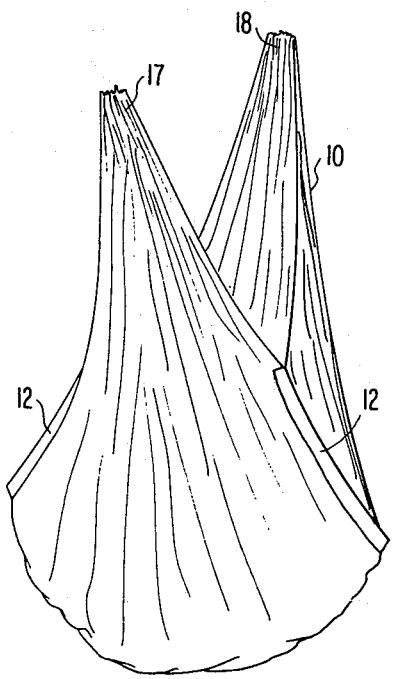
FIG. 5 shows the used liner and contents after removal from the litter box.
Figure 6:
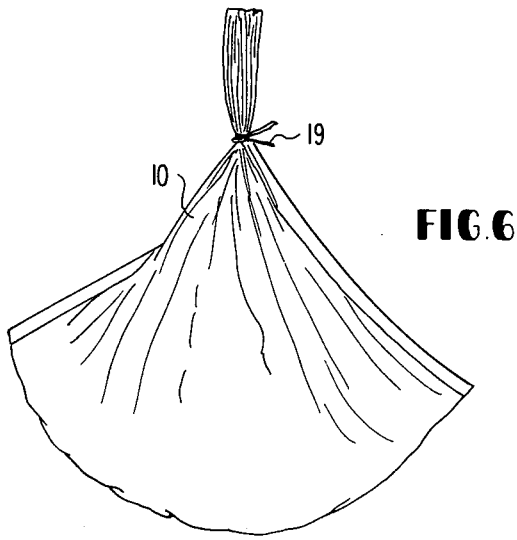
FIG. 6 shows the used liner and contents ready for disposal.

Ends 17 and 18 of liner 10 are then brought together (FIG. 5) and tied with bag closure 19 (FIG. 6), in which condition the liner and its contents are easily and neatly disposed of.

I claim:

1. An animal commode comprising the combination of (a) a rectangular animal litter box having a bottom and four sides, (b) a flat, disposable, plastic film liner lining the inside of the box, said liner, when flattened out, being shaped like a rectangle, and said liner having a transverse slit opening therein at about its center, the length of the slit opening being no greater than the width of the rectangle, which opening communicates with a collapsible pocket which lies flat beneath the liner, whereby the pocket will fall open when the liner is lifted from the box by its edges, and will receive and hold soiled adsorbent that has been resting on top of the liner, and (c) a layer of particulate, sanitary adsorbent on top of the liner.

2. The commode of claim 1 wherein the pocket is collapsible into a flat rectangle which can lie to one side of the opening, beneath the liner, when the liner is lying in the litter box.

3. The commode of claim 2 wherein the transverse slit extends substantially completely across the width of the liner.

4. The commode of claims 1, 2, or 3 wherein the plastic film is low density polyethylene film.

5. The commode of claims 1, 2 or 3 wherein the plastic film is low density polyethylene film having a thickness of about 0.8 to 2.0 mil.

6. The commode of claims 1, 2 or 3 wherein the plastic film is low density polyethylene film having a thickness of about 1.0 to 1.5 mil.

7. The commode of claim 1 additionally comprising means for releasably holding the liner to the tops of the sides of the box.

8. The commode of claim 7 wherein the plastic film is low density polyethylene film.

9. The commode of claim 8 wherein the pocket is collapsible into a flat rectangle which can lie to one side of the opening, beneath the liner, when the liner is lying in the litter box.

10. The commode of claim 9 wherein the liner holding means is a rim which fits tightly around the top of the box, clamping the peripheral margin of the liner between the tops of the sides of the box and the rim.

11. The commode of claim 10 wherein the polyethylene film has a thickness of about 0.8 to 2.0 mil.

12. The commode of claim 10 wherein the polyethylene film has a thickness of about 1.0 to 1.5 mil.

* * * * *